United States Patent
O'Mahony et al.

(10) Patent No.: US 12,367,026 B2
(45) Date of Patent: Jul. 22, 2025

(54) DATA STREAM MODEL TRANSFORMATION

(71) Applicant: Dell Products, L.P., Hopkinton, MA (US)

(72) Inventors: Lisa O'Mahony, Glanmire (IE); Francisco Jaen, Cork (IE)

(73) Assignee: Dell Products, L.P., Hopkinton, MA (US)

( * ) Notice: Subject to any disclaimer, the term of this patent is extended or adjusted under 35 U.S.C. 154(b) by 150 days.

(21) Appl. No.: 18/238,705

(22) Filed: Aug. 28, 2023

(65) Prior Publication Data
US 2025/0077206 A1 Mar. 6, 2025

(51) Int. Cl.
*G06F 8/51* (2018.01)

(52) U.S. Cl.
CPC ..................... *G06F 8/51* (2013.01)

(58) Field of Classification Search
CPC ......................................... G06F 8/51
USPC ......................... 717/104–109, 137
See application file for complete search history.

(56) References Cited

U.S. PATENT DOCUMENTS

| | | | | |
|---|---|---|---|---|
| 11,562,140 B2 * | 1/2023 | Thomas | ............ | G06F 40/253 |
| 2023/0393818 A1 * | 12/2023 | Bansal | ............ | G06F 8/34 |

OTHER PUBLICATIONS

Eriksson et al., "Comparison between JSON and YAML for data serialization", 2011, KTH Royal Institute of Technology, Sweden, 29 pages. (Year: 2011).*

Cloud Privacy Labs, "Schema Model", 2022, retrieved from https://layeredschemas.org/docs/model_and_syntax/#schemaoverlay-header , 12 pages. (Year: 2022).*

Heineman et al., "Thresh : A Unified, Customizable and Deployable Platform for Fine-Grained Text Evaluation", Aug. 14, 2023, arXiv:2308.06953v1, 10 pages. (Year: 2023).*

* cited by examiner

*Primary Examiner* — Ted T. Vo
(74) *Attorney, Agent, or Firm* — Anderson Gorecki LLP

(57) ABSTRACT

A data stream transformer maps a source data stream model of a source application to a set of one or more destination models of consumer applications. Each destination model is described using a JSON schema. A configuration YAML file having one or more templates is created, with each template being based on the JSON schema and defining methods that the data stream transformer uses to map the source data stream model into the respective destination model. The JSON schema defining the destination model is compiled to create a set of destination model classes. The source application creates source objects forming the source data stream. The data stream transformer uses reflection to retrieve the values of the source objects and uses the template and destination model classes to build destination model objects based on the values of the source model objects. The destination model objects are output to the consumer application.

20 Claims, 10 Drawing Sheets

Example Source Model

Example Destination Model

Example YAML Configuration file

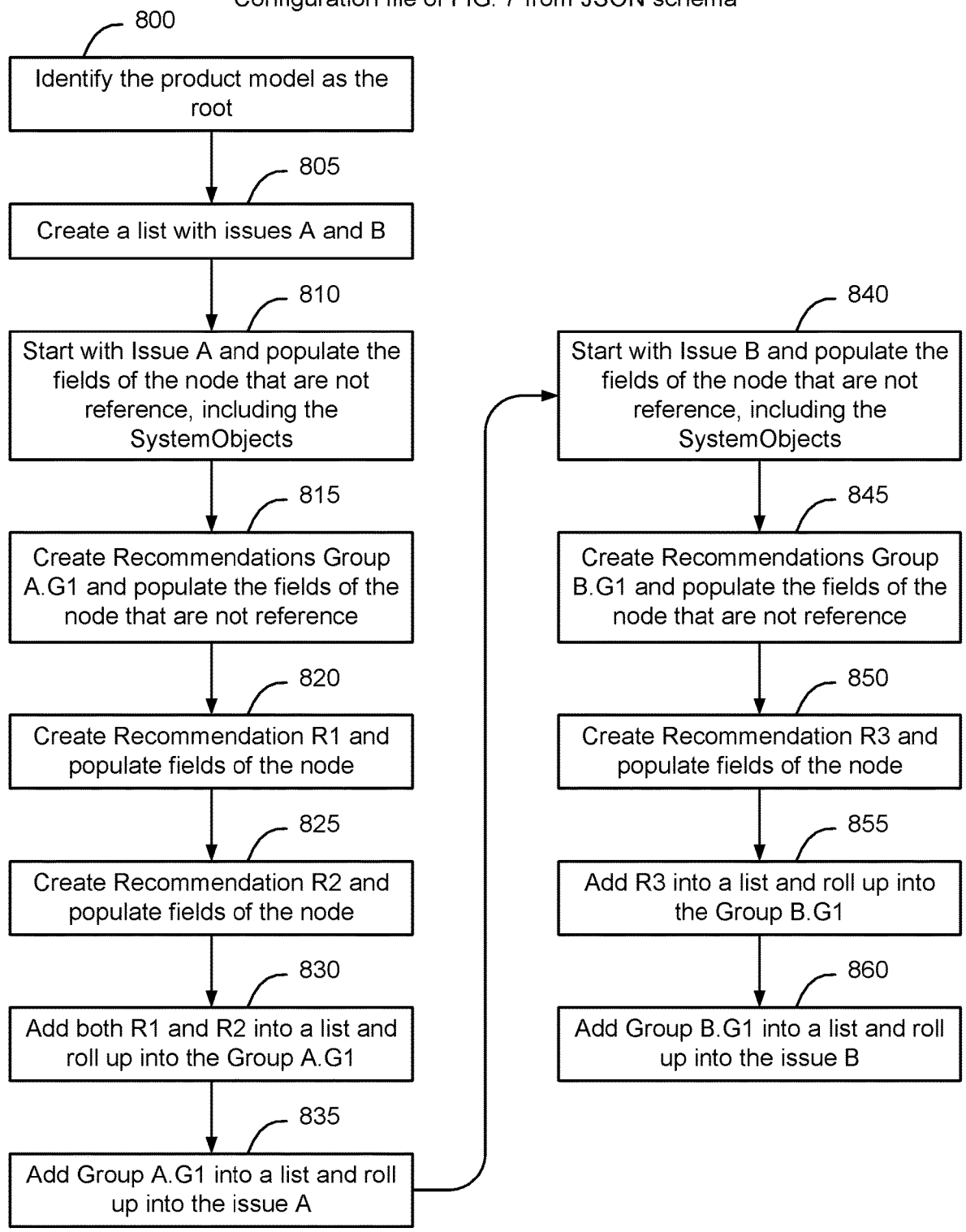

FIG. 9
Example Destination Model – JSON schema

```
Nodes:
  - className: productName
    nodeType: root
    fields:
      - name: system            (FIG. 11A)
        value: id
        type: string
        model: product
      - name: componentType     (FIG. 11B)
        value: 'array'
        type: string
      - name: systemModel       (FIG. 11C)
        value: model
        type: string
        model: product
      - name: timestamp         (FIG. 11D)
        value: LastProcessTime
        type: long
        model: issue
      - name: schemaVersion     (FIG. 11E)
        value: '1.0.0'
        type: string
      - name: issues            (FIG. 11F)
        value: issues
        $ref: 'IssuesGroupModel'
        type: array
        ignored: true
```

FIG. 10
Serialized object

```
{
  "system": "00297901855",
  "componentType": "Array",
  "systemModel": "PowerMax_2500",
  "timestamp: "1687862630043",
  "schemaVersion": "1.0.0",
  "issues": [{ . . . }, { . . . }, . . . ]
}
```

Example template definition

Example template definition

Example template definition

FIG. 11D
Example template definition

| - name: timestamp<br>value: LastProcessTime<br>type: long<br>model: issue | → | Sets the "timestamp" on the destination model with the value of the property "LastProcessTime". The value of the property "LastProcessTime" is found in the "issue" class of the source model. The expected value is "long" type |

FIG. 11E
Example template definition

| - name: SchemaVersion<br>value: '1.0.0'<br>type: string | → | Sets the "SchemaVersion" on the destination model with the fixed value "1.0.0". The expected value is "string" type |

FIG. 11F
Example template definition

| - name: issues<br>value: issues<br>$ref: 'IssuesGroupModel'<br>type: array<br>ignored: true | → | Sets the "issues" on the destination model as an array, and the array content is a build on the IssueGroupModel node class on the template. The "ignored" property means that it will just be a list of aggregated objects, in this case issues (value: issues). |

DATA STREAM MODEL TRANSFORMATION

FIELD

This disclosure relates to computing systems and related devices and methods, and, more particularly, to a method and apparatus for transforming a source data stream model into a destination data stream model.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a method and apparatus for transforming a source data stream model into a destination data stream model is provided. When a source application such as software as a service generates a stream of data, the source application is required to transform the data generated by the source application into a destination model required by a consumer application. For example, the consumer application will expect the data that it receives to be organized in a particular manner, so that the consumer application is able to decipher the data that it receives from the source application. While it is possible to implement the data transformation within the source application, so that the source application provides an output data stream according to the destination model of the consumer application, any time the destination model required by the consumer application changes, a corresponding code change must be made at the source application. Likewise, if the format of the data stream created by the source application changes, the code implementing the source application will need to be updated to ensure that the source application provides an output data stream according to the destination model required by the consumer application. When the source application is required to provide multiple output data streams defined using multiple destination models, this becomes complex and the need to continually add new code can lead to a lack of standards, performance issues, and an increased risk of errors and faults.

As an example, assume that a storage system monitoring service (source application) is provided that receives operational status as input from multiple storage systems. The operational status of the storage systems is processed/generated by the storage system monitoring service, which is referred to herein as the source data model. For example, the storage system monitoring system may be configured to process status updates from the storage systems and generate alerts to notify users of storage system faults or other operational conditions that require attention. These alerts are generated by the storage system monitoring service according to the source data model. However, different users might use different consumer applications to receive and process alerts relating to their storage systems, and accordingly might require the output of the storage system monitoring service to be formatted or otherwise conform to particular destination models, so that the data stream that the consumer applications receive is in a format expected by the consumer application.

According to some embodiments, rather than programming the storage system monitoring service to implement the desired transformation between the source model and a required set of one or more destination models, a data stream transformer is created that maps the source model to a set of one or more destination models. Each destination model is described using a destination model schema, which may be implemented for example using JavaScript Object Notation (JSON) schema. The destination model is created with knowledge of the source model, and describes the destination model of the output data stream to be implemented by the data stream transformer. A set of destination model classes are then created from the destination model schema. For example, in some embodiments the destination model classes are implemented as JAVA classes and a tool such as JsonSchema2Pojo is used to compile the JSON schema into a set of JAVA classes of the destination model.

A configuration YAML file is also created, which defines a transformation between an input data stream that is based on the source model provided by the source application and an output data stream based on the destination model defined in the JSON schema. The YAML file, in some embodiments, is built by walking the JSON schema to create a hierarchical relationship between the objects of the input data stream and objects of the output data stream, and to define the methods required to implement the data stream transformation.

When the source application is started, the data stream transformer compiles the JSON schema (if not done previously) to create the classes of the destination model. In some embodiments, to improve runtime performance, the data stream transformer loads the classes of the destination model into memory and also loads in memory the destination model methods needed for the transformation between the source model to the destination model based on the YAML template of the configuration file. When an event causes a change to a set of objects of the source model, the data stream transformer uses reflection to retrieve the object values, and uses the YAML template and classes to create destination model objects based on the destination model classes and the values of the source model objects. The destination class objects are then output to the consumer application as the output data stream. Since the output data stream contains objects that were created from the destination model schema, the output data stream is in conformance with the destination model. Since the configuration YAML template defines the mapping methods between the input object values and the output object values, the output data stream is a transformed version of the input data stream, thus enabling the output of the source application be transformed into any desired destination model without requiring modification to the code implementing the source application.

By using a data stream transformer that is based on a configuration file, it is possible to transform an input data stream based on a source model to a set of output data streams based on a set of destination models. Any time the source model of the input data stream changes, or any time the destination model of one of the output data streams changes, it is possible to accommodate that change in the data stream transformer simply by changing the configuration file. Since the configuration file is created based on a destination model JSON schema, changing the data stream transformer configuration can be implemented simply by adjusting the JSON schema defining relationship between the source model and the destination model. This simplifies the source application that is providing the output, because it is no longer necessary to change the code of the source application in connection with changes to the destination model. The data stream transformer can transpose data from a source model to any defined unrelated destination model using standardized configuration definition, which is able to be implemented regardless of the destination model's complexity. In some embodiments the data stream transformer configuration file is implemented using recursive techniques to drill down into complex models without the requirement for custom code or access to data outside the data stream.

In some embodiments, a method of data stream model transformation, includes creating a first destination model JSON schema describing the first destination data stream model of a first destination data stream, creating a first YAML template based on the first destination model JSON schema, the first YAML template defining a first transformation to be implemented by a data stream transformer to transform the source data stream having a source data stream model into the first destination data stream having the first destination data stream model, and compiling the first destination model JSON schema, by the data stream transformer, to create a set of first destination model classes. The method further includes generating the source data stream by a source application, the source data stream including source objects generated by the source application, the source objects being defined according to the source data stream model, using reflection, by the data stream transformer, to obtain the source objects, and using the first YAML template, by the data stream transformer, to generate a corresponding first destination objects from the source objects, the corresponding first destination objects being created from the set of first destination model classes and forming the first destination data stream defined according to the first destination data stream model.

In some embodiments, each source object includes one or more values, and the first YAML template defines a first set of methods configured to set values of the first destination objects based on the one or more values of the source objects.

In some embodiments, the first destination model JSON schema defines a root node having a plurality of fields, at least some of the fields each including a plurality of properties. In some embodiments, the properties include a name of the property on the first destination model, a value of the property on the source model, and a source object of the source data stream model where the value of the property is located. In some embodiments, the properties include a reference to another first destination model class.

In some embodiments, the method further includes creating a second destination model JSON schema describing a second destination data stream model, creating a second YAML template based on the second destination model JSON schema, the second YAML template defining a second transformation to be implemented by the data stream transformer to transform the source data stream having the source data stream model into the second data stream having the second destination data stream model, and compiling the second destination model JSON schema, by the data stream transformer, to create a set of second destination model classes. In some embodiments, the method further includes using the second YAML template, by the data stream transformer, to generate corresponding second destination objects from the source objects, the corresponding second destination objects being created from the set of second destination model classes and forming the second destination data stream defined according to the second destination data stream model.

In some embodiments, the first YAML template and the second YAML template are contained in a single configuration file accessed by the data stream transformer, the single configuration file being used by the data stream transformer to generate both the first destination data stream and the second destination data stream. In some embodiments, each source object includes one or more values, and the second YAML template defines a second set of methods configured to set values of the second destination objects based on the one or more values of the source objects. In some embodiments, the second destination model JSON schema defines a root node having a plurality of fields, at least some of the fields each including a plurality of properties. In some embodiments, the properties include a name of the property on the second destination model, and a value of the property, the value of the property being either a static value, or a value of the property on the source model and a source object of the source data stream model where the value of the property is located.

In some embodiments, a system for data stream model transformation includes one or more processors and one or more storage devices storing instructions that are operable, when executed by the one or more processors, to cause the one or more processors to perform operations including creating a first destination model JSON schema describing the first destination data stream model of a first destination data stream, creating a first YAML template based on the first destination model JSON schema, the first YAML template defining a first transformation to be implemented by a data stream transformer to transform a source data stream having a source data stream model into the first destination data stream having the first destination data stream model, and compiling the first destination model JSON schema, by the data stream transformer, to create a set of first destination model classes. The operations further include generating the source data stream by a source application, the source data stream including source objects generated by the source application, the source objects being defined according to the source data stream model, using reflection, by the data stream transformer, to obtain the source objects, and using the first YAML template, by the data stream transformer, to generate corresponding first destination objects from the source objects, the corresponding first destination objects being created from the set of first destination model classes and forming the first destination data stream defined according to the first destination data stream model.

In some embodiments, each source object includes one or more values, and the first YAML template defines a first set of methods configured to set values of the first destination objects based on the one or more values of the source objects.

In some embodiments, the first destination model JSON schema defines a root node having a plurality of fields, at least some of the fields each including a plurality of properties. In some embodiments, the properties include a name of the property on the first destination model, a value of the property on the source model, and a source object of the source data stream model where the value of the property is located. In some embodiments, the properties include a reference to another first destination model class.

In some embodiments, the operations further include creating a second destination model JSON schema describing a second destination data stream model, creating a second YAML template based on the second destination model JSON schema, the second YAML template defining a second transformation to be implemented by the data stream transformer to transform the source data stream having the source data stream model into the second data stream having the second destination data stream model, and compiling the second destination model JSON schema, by the data stream transformer, to create a set of second destination model classes. In some embodiments, the operations further include using the second YAML template, by the data stream transformer, to generate corresponding second destination objects from the source objects, the corresponding second destination objects being created from the set of second destination model classes and forming the second destination data stream defined according to the second destination data stream model.

In some embodiments, the first YAML template and the second YAML template are contained in a single configuration file accessed by the data stream transformer, the single configuration file being used by the data stream transformer to generate both the first destination data stream and the second destination data stream.

In some embodiments, each source object includes one or more values, and the second YAML template defines a second set of methods configured to set values of the second destination objects based on the one or more values of the source objects. In some embodiments, the second destination model JSON schema defines a root node having a plurality of fields, at least some of the fields each including a plurality of properties. In some embodiments, the properties include a name of the property on the second destination model, and a value of the property, the value of the property being either a static value, or a value of the property on the source model and a source object of the source data stream model where the value of the property is located.

BRIEF DESCRIPTION OF THE DRAWINGS

FIG. 8 is a flowchart of an example process of creating the YAML configuration file of FIG. 7 from a JSON schema defining a destination model of an output data stream, according to some embodiments.

FIG. 9 is an example destination model JSON schema, according to some embodiments.

FIG. 10 is an example serialized object created from a destination model class, the destination model class being created from destination model JSON schema of FIG. 9, according to some embodiments.

FIGS. 11A-11F are example template definitions of portions of the example destination model JSON schema of FIG. 9, according to some embodiments.

DETAILED DESCRIPTION

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure. Those of ordinary skill in the art will recognize that there are a wide variety of implementations of the inventive concepts in view of the teachings of the present disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
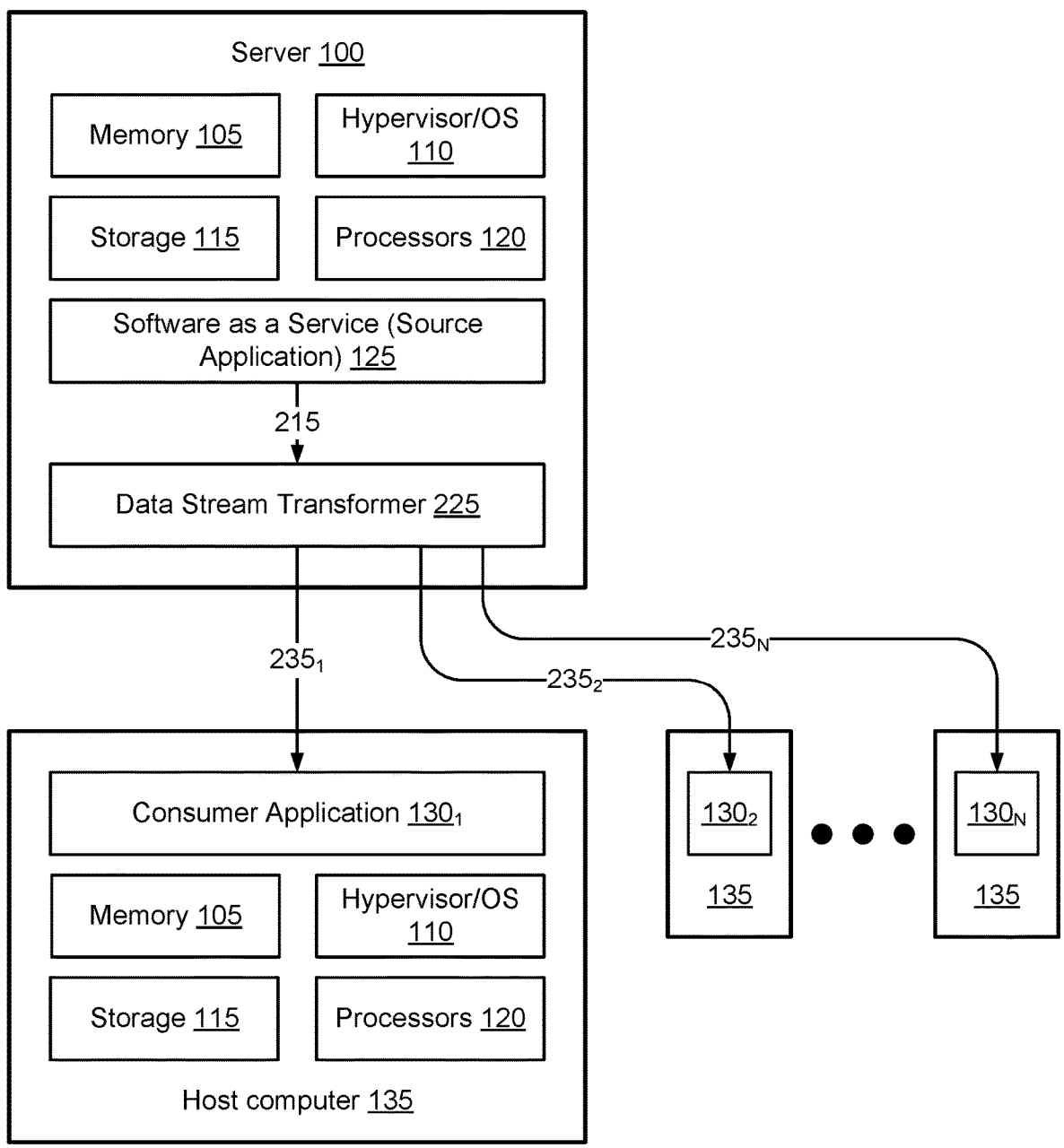
FIG. 1 is a block diagram of an example source application executing on a server and containing a data stream transformer configured to transform an input data stream based on a source model provided by the source application into a set of output data streams based on a set of destination models required by a set of consumer applications, according to some embodiments.

FIG. 1 is a block diagram of an example source application 125 executing on a server 100 and containing a data stream transformer 225 configured to transform an input data stream 215 based on a source model 220 provided by the source application 125 into a set of output data streams 235 based on a set of destination models 240 required by a set of consumer applications 1301-130N, according to some embodiments. As shown in FIG. 1, in some embodiments a source application 125 executes on a first computer such as a server 100. The server 100 includes common computer components configured to enable execution of the source application 125, including a memory 105, hypervisor/operating system 110, storage 115, and one or more processors 120. An example source application might be implemented as software as a service, although the particular source application 125 will depend on the particular implementation.

A consumer application 130 executes on a second computer such as a host computer 135. The host computer 135 includes common computer components configured to enable execution of the consumer application 130, including a memory 105, hypervisor/operating system 110, storage 115, and one or more processors 120. The consumer application 130, in FIG. 1, receives the output of the source application after the output of the source application has been passed through the data stream transformer 225. Although FIG. 1 shows the source application 125 and consumer application 130 on separate computer platforms, it should be understood that the source application 125 and consumer application 130 can also execute on the same computer platform, depending on the implementation.

As shown in FIG. 1, in some embodiments a data stream transformer 225 is interposed between the source application 125 and the consumer application 130. The data stream transformer 225 is configured to receive an input data stream 215 based on a source model 220 and transform the data stream into an output data stream 235 based on a destination model 240. As used herein, the term "source model" is used to refer to the configuration and selection of objects and object values created by the source application 125. As used herein, the term "destination model" is used to refer to the configuration and selection of objects and object values consumed by the consumer application 130. As used herein, the terms "source model" and "destination model" are used to refer to different configurations and selections of objects, such that the configuration and selection of at least some of the objects of the source model is different than at least some of the configuration and selection of objects of the destination model.

As shown in FIG. 1, in some embodiments the data stream transformer 225 is configured to provide the output data stream 235 to multiple instances of consumer applications 130. In some embodiments, several or all of the multiple consumer instances of consumer application 130 may be all the same, and require an output data stream based on the same destination model, or several or all of the multiple consumer instances may be different and require unique output data streams 2351, 2352, . . . , 235N based on different destination models.

Figure 2:
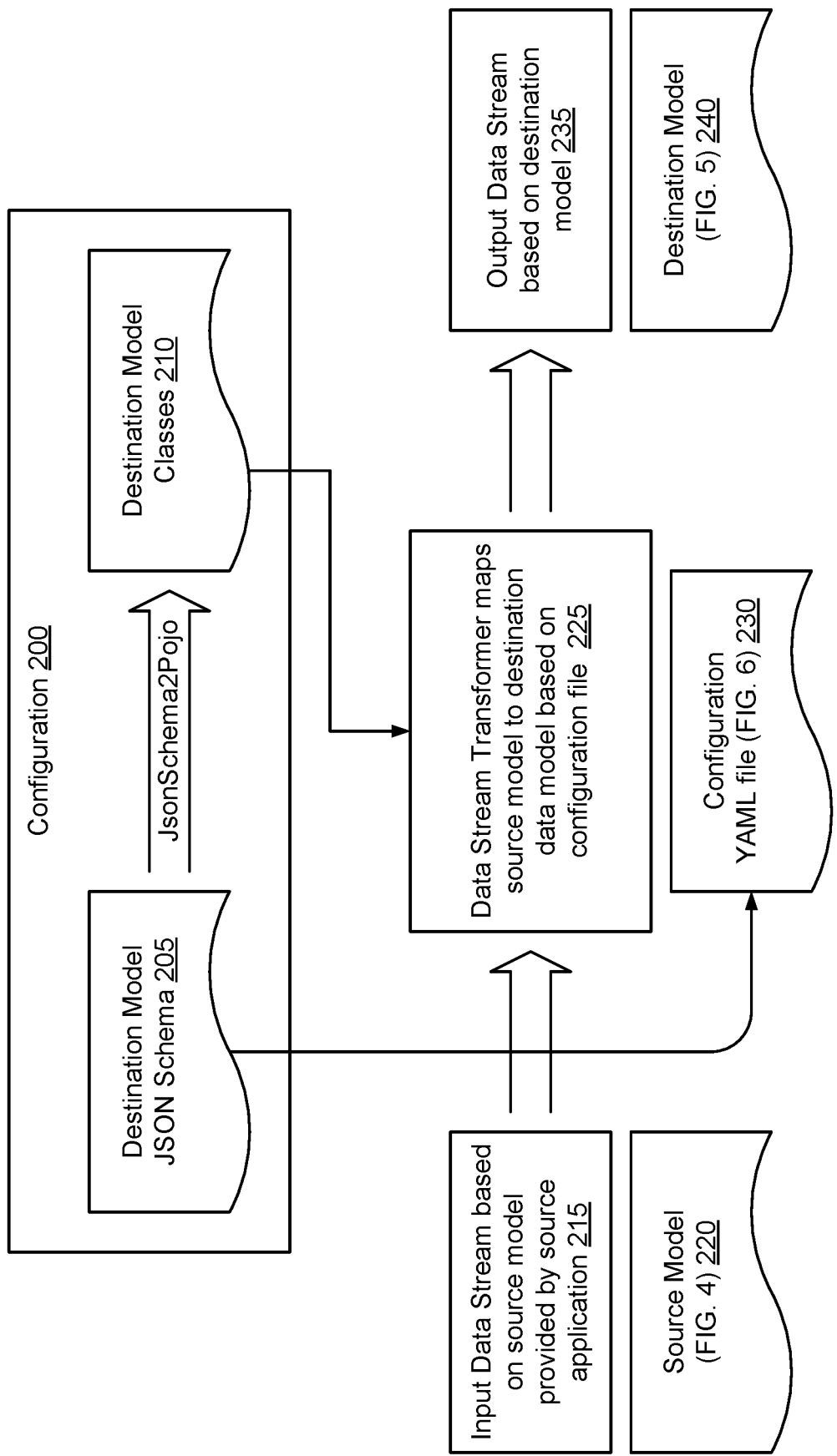
FIG. 2 is a block diagram of a data stream including a data stream transformer created to implement a transformation from an input data stream based on a source model to an output data stream based on a destination model. The transformation implemented by the data stream transformer is based on a configuration file created from a destination model JSON schema, according to some embodiments.

FIG. 2 is a block diagram of a data stream including a data stream transformer 225 created to implement a transformation from an input data stream 215 based on a source model 220 to an output data stream 235 based on a destination model 240. The transformation implemented using the data stream transformer 225 is based on a configuration file 230 created from a destination model JavaScript Object Notation (JSON) Schema 205, according to some embodiments. JSON is a simple data interchange format, that is built on a set of data structures. Since there are many ways that data may be represented using the set of data structures, the JSON Schema is used to define how the data should be organized, that is the JSON Schema defines a set of expected fields and how the values are represented.

In some embodiments, the destination model JSON Schema enables the user to specify, for each class of object that is to be created in the destination model, the name of the class, the type (root or not), and a plurality of fields. In some embodiments the supported fields include:

name: the name of the property on the destination model;
value: the name of the property on the source model;
model: if populated, this field is used to refer to the source model object where the "value" can be located;
type: the type of the field to be set, as in java.lang (primitive: byte, short, int, long, float, double, Boolean, char; non-primitive: string, array, class), or also "object" and "array";
Ignored: if true, the group creates just a list of aggregated objects;
$ref: this is used to refer to another class within the template; and
transformer: the transformer class name.

The destination model JSON Schema is used, in some embodiments, in two ways. In some embodiments, the destination model JSON Schema defines the classes of the output stream and, accordingly, is compiled at runtime to create instances of the of the classes of the output data stream that are loaded to memory of the data stream transformer. For example, in embodiments where the destination model classes are JAVA classes, the destination model JSON Schema 205 can be compiled using JsonSchema2Pojo to create a set of JAVA destination model classes 210. In instances where other types of classes are used, such as C#, the JSON schema 205 is compiled using a corresponding tool to create the required classes. The particular format of the destination model classes 210, accordingly, will depend on the particular implementation.

In some embodiments, the destination model JSON Schema 205 is also used to create a configuration file for use by the data stream transformer to define the transformation between the input data stream and the output data stream. In some embodiments, the configuration file 230 is implemented as a YAML file. YAML is a human-readable data serialization language that is commonly used for configuration files. Structure of an example YAML file is shown, for example, in FIG. 7.

Figure 3:
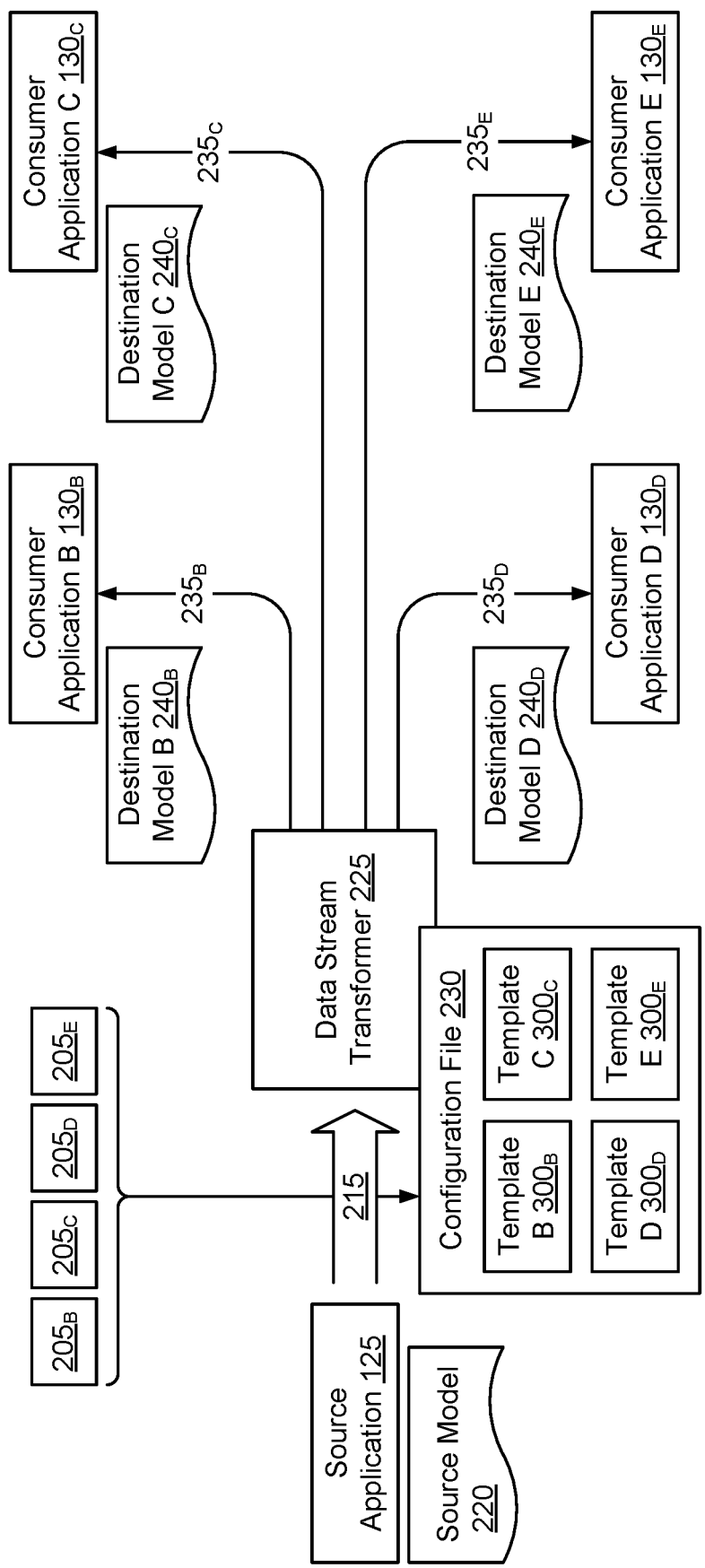
FIG. 3 is a block diagram of a data stream including a data stream transformer created to implement a transformation from an input data stream based on a source model to a set of multiple output data streams, each output data stream being based on a different destination model. The transformations implemented by the data stream transformer are based on a configuration file having multiple templates, each template being created from a respective destination model JSON schema describing the respective destination model, according to some embodiments.

FIG. 3 is a block diagram of a data stream including a data stream transformer 225 created to implement a transformation from an input data stream 215 based on a source model 220 to a set of multiple output data streams 235B, 235c, 235D, 235E, each output data stream being based on a respective different destination model 240B, 240c, 240D, 240E. The transformations implemented using the data stream transformer are based on a single configuration file 230 having multiple templates 300B, 300c, 300D, 300E, each template being created from a respective destination model schema 205B, 205c, 205D, 205E, describing the respective destination model, according to some embodiments.

As shown in FIG. 3, in some embodiments a respective destination model JSON Schema 205B, 205c, 205D, 205E is created for each output data stream destination model 240B, 240c, 240D, 240E. Specifically, a first destination model JSON Schema 205B for destination model B is used to define the output data stream 235B. A second destination model JSON Schema 205c for destination model C is used to define the output data stream 235c. A third destination model JSON Schema 205D for destination model D is used to define the output data stream 235D. A fourth destination model JSON Schema 205E for destination model E is used to define the output data stream 235E. Each of the JSON Schemas 205 are used to create a respective YAML template 300B, 300c, 300D, 300E, which are included in the configuration file 230 of the data stream transformer 225. YAML structures enable storage of multiple documents within a given file, which enables, for example as shown in FIG. 3, a single configuration file 230 to include multiple templates 300B, 300c, 300D, 300E, defining the multiple transformations to be implemented between a single source model 220 and multiple output data stream models 240B, 240c, 240D, 240E. By converting between the source model 220 and multiple destination models 240B, 240c, 240D, 240E, the data stream transformer enables simultaneous consumption by multiple consumer applications 130B, 130c, 130D, 130E, in which each consumer application 130 is able to receive a data stream based on its respective required destination model.

Figure 4:
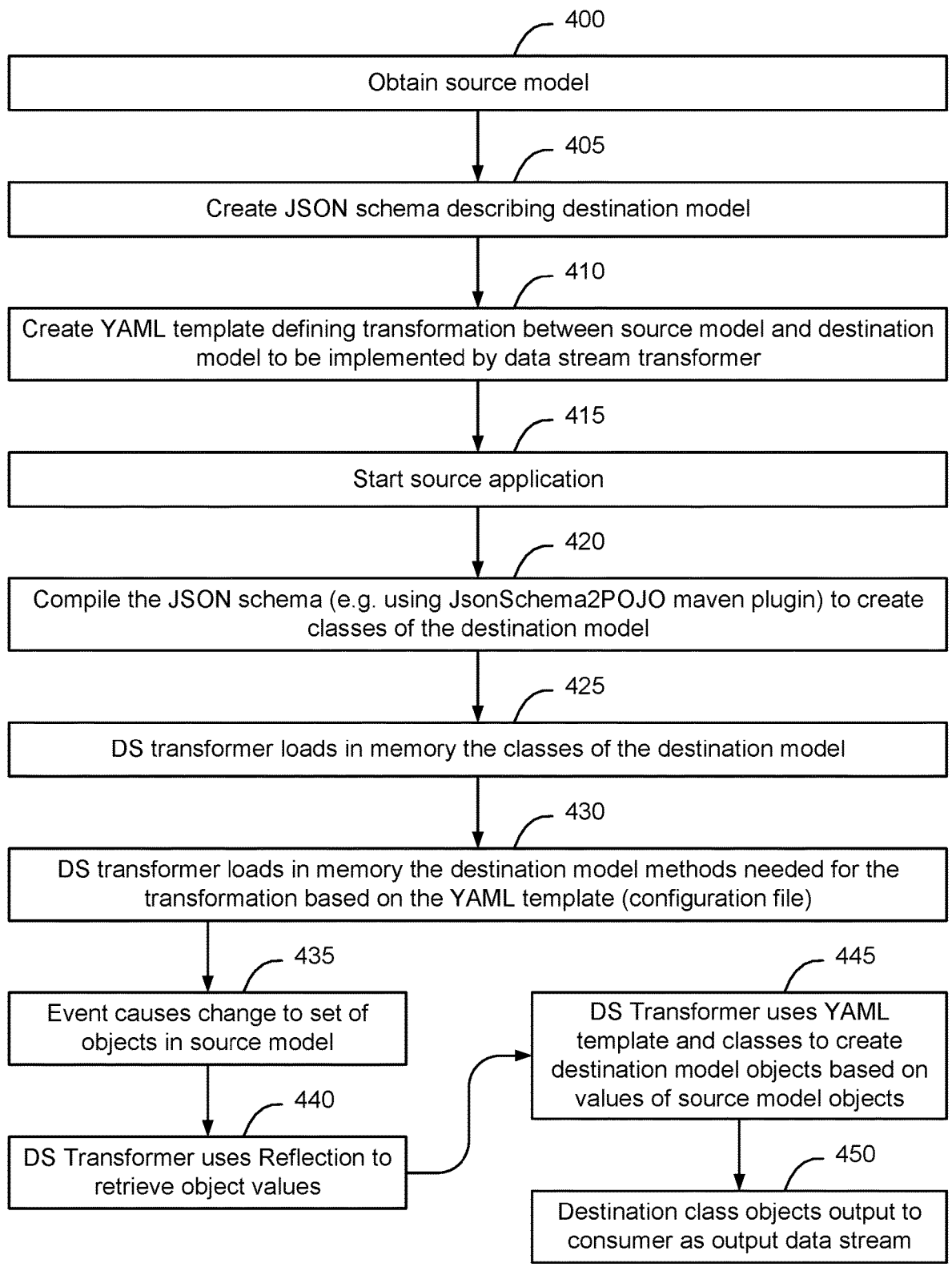
FIG. 4 is a flowchart of an example process of creating a data stream transformer and using the data stream transformer to transform an input data stream based on a source model to an output data stream based on a destination model, according to some embodiments.

FIG. 4 is a flowchart of an example process of creating a data stream transformer and using the data stream transformer to transform an input data stream based on a source model to an output data stream based on a destination model, according to some embodiments. As shown in FIG. 4, in some embodiments the source model is obtained (block 400). The source model, in some embodiments, contains a set of source classes that define the type and format of objects that are created by the source application as the input data stream 215. A destination model JSON Schema 205 is also created describing the output data stream 235 and the relationship between the source model and destination model (block 405). An example destination model JSON schema is described, for example, in connection with FIG. 9 and FIGS. 11A-11E. In some embodiments, the JSON schema describes the destination classes that identify the type of objects, the information carried by the objects in the output data stream 235, and the source of the information, for example the source model object that contains the information in the source data stream 220. A YAML template is created from the JSON schema that defines the transformation between the source model and the destination model that is to be implemented by the data stream transformer (block 410). An example YAML template is described, for example, in connection with FIGS. 7-8.

The source application 125 is then started (block 415). The JSON schema created in block 405 is compiled to create classes of the destination model (block 420). In embodiments where the classes are JAVA classes, the tool JsonSchema2Pojo maven plugin may be used to create the classes of the destination model. In embodiments where the classes are to be implemented using a language other than JAVA, such as C#, the destination model JSON schema is compiled using a corresponding tool to create the required classes in the desired format. The classes of the destination model will be used by the data stream transformer 225 to create corresponding objects for consumption by the consumer application 130 in the output data stream 235.

In some embodiments, to enhance performance of the data stream transformer 225, the data stream transformer loads the classes of the destination model into memory (block 425) and also loads the destination model methods needed for the transformation based on the YAML template of the configuration file into memory (block 430).

When an event causes a change to a set of objects in the source model (block 435), for example when the source application 125 creates one or more source objects or one or more values of one or more of the objects of the data stream provided by the source application 125 are changed, the data stream transformer uses "reflection" to retrieve the object values (block 440). "Reflection", as that term is used herein, refers to a programming technique that gives code introspective abilities. Reflection APIs are built into many programming languages allow code to be inspected at runtime. Using reflection allows the data stream transformer 225 to discover codebase entities such as objects and object values of the source application while the source application is executing. In some embodiments, the source application's reflection API allows the data stream transformer to inspect classes, methods, properties, and types, during runtime, to inspect the objects created by the source application 125 in connection with creating the source data stream 215.

The data stream transformer uses the YAML template 300 of the configuration file 230 and the destination classes 210 to create destination model objects based on the values of the source model objects (block 445). The destination class objects are output to the consumer application 130 as the output data stream 235 (block 450).

Figure 5:
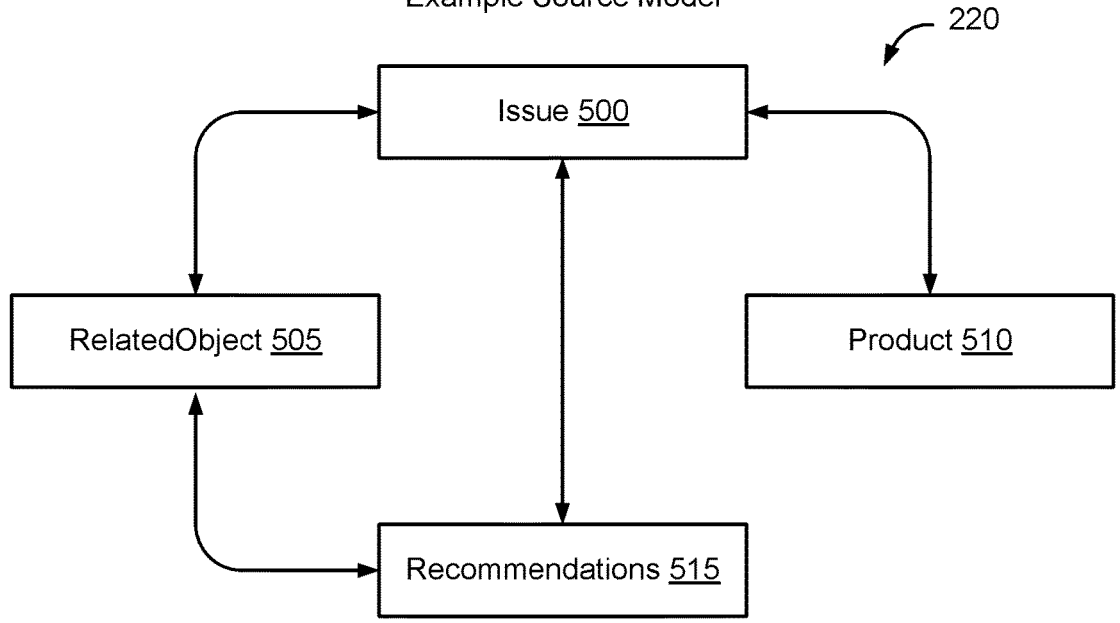
FIG. 5 is a block diagram of an example source model, according to some embodiments.
Figure 6:
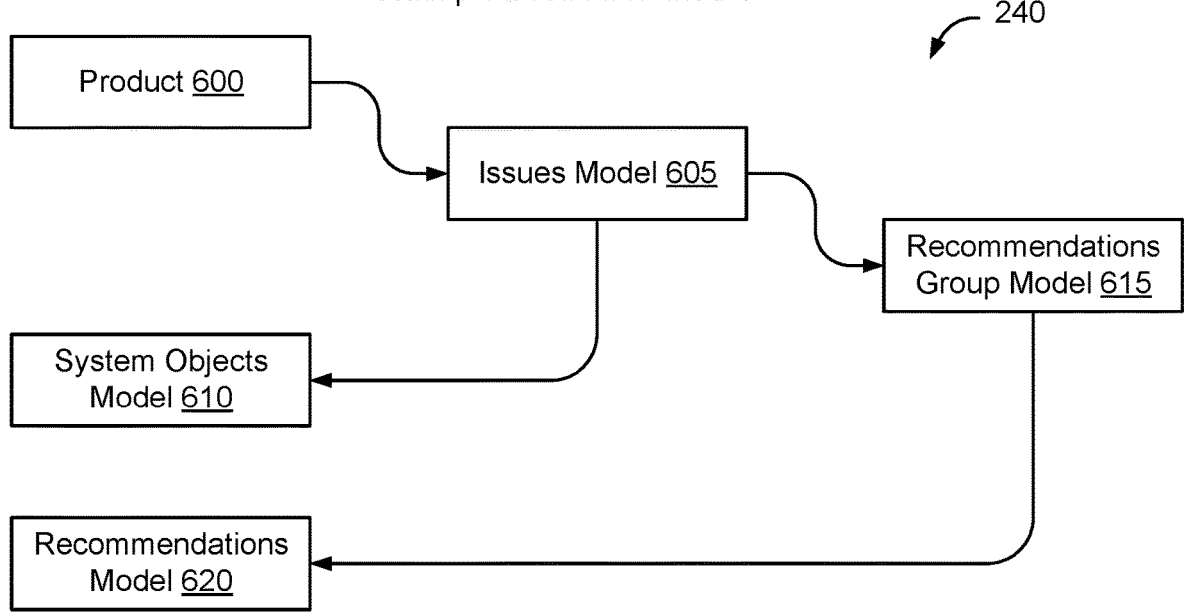
FIG. 6 is a block diagram of an example destination model, according to some embodiments.

FIGS. 5 and 6 show a hypothetical source model and hypothetical destination model, in which FIG. 5 is a block diagram of an example hypothetical source model 220, and FIG. 6 is a block diagram of an example hypothetical destination model 240. In this example, the source model 220 correlates product 510 with issues 500. Under issues 500, there are recommendations 515 and related objects 505, which are also related to each other. The destination model 240, by contrast, correlates product 600 with an issues model 605. Under the issues model 605 there is a system object model 610 and a recommendations group model 615. The recommendations group model 615 references a recommendations model 620.

Figure 7:
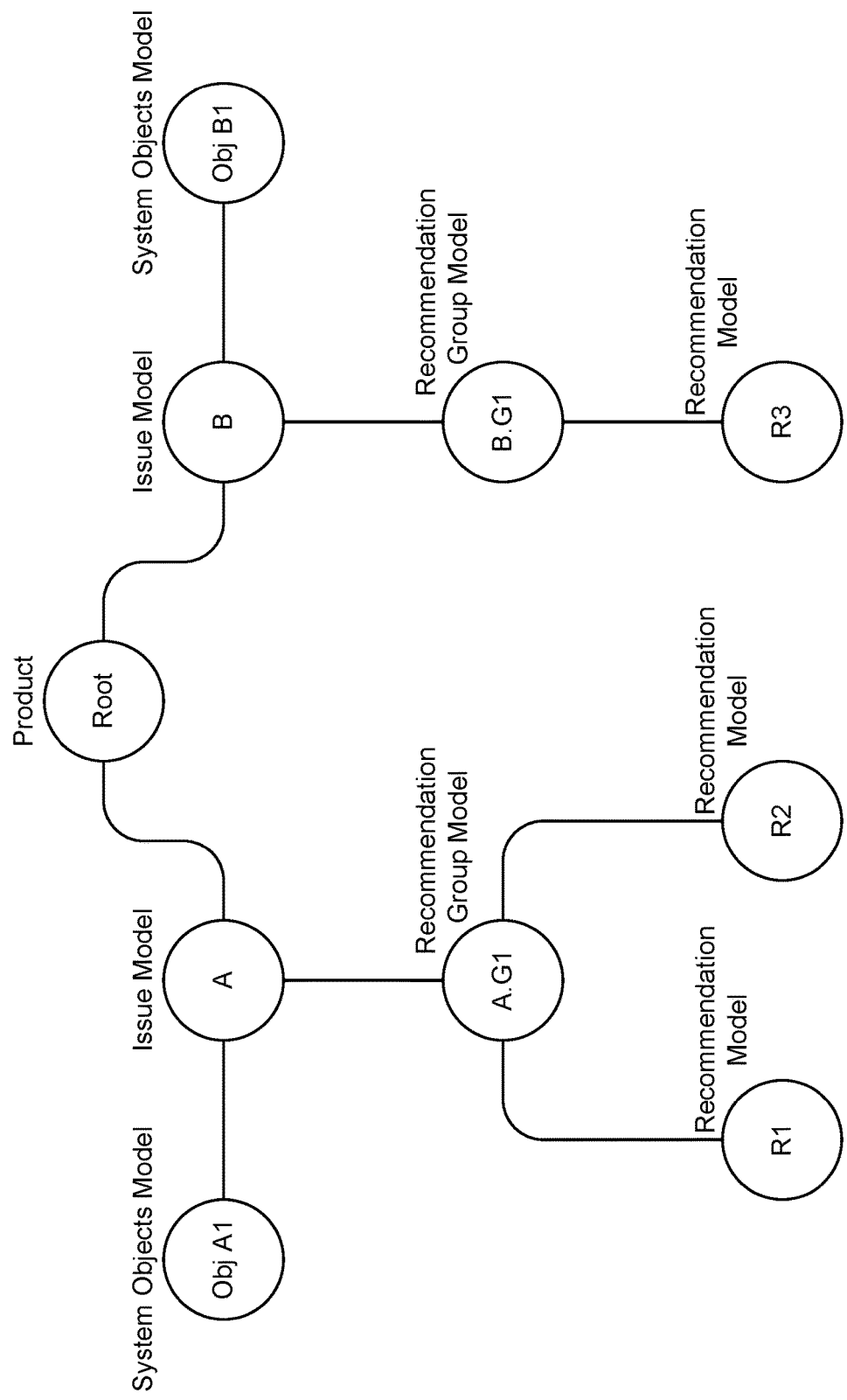
FIG. 7 is an example YAML configuration file for use by a data stream transformer to specify an example transformation to be implemented by the data stream transformer to transform an input data stream based on a source model to an output data stream based on a destination model, according to some embodiments.

FIG. 7 shows an example structure of a YAML configuration file for use by a data stream transformer to specify an example transformation to be implemented by the data stream transformer to transform an input data stream of FIG. 5 to an output data stream based on the destination model of FIG. 6, according to some embodiments. FIG. 8 is a flowchart of an example process of creating the YAML configuration file of FIG. 7 from a JSON schema defining the destination model shown in FIG. 6, according to some embodiments.

As shown in FIGS. 7 and 8, in the destination model of FIG. 6, the product model 600 is identified as the root (FIG. 8, block 800; FIG. 7 circle labeled "Root"). In this example, it is assumed that the issues model 605 includes two issues, issue A and issue B. Accordingly, a list is then created with issues A and B (block 805). The method of creating the YAML file starts with issue A and populates the fields of the node that are not reference, including the system objects (block 810). In FIG. 7, this results in creation of node A based on the Issue Model and creation of Obj A1 from the system objects model 610. Recommendations group A. G1 is then created, and the fields of the node that are not reference are populated (block 815). In FIG. 7, this results in creation of node A.G1 based on the recommendation group model 615. Recommendation R1 is then created and fields of the node are populated (block 820). Similarly, recommendation R2 is then created and fields of the node are populated (block 825). In FIG. 7, this results in creation of nodes R1 and R2 based on the recommendation model 620. Both R1 and R2 are added into a list and rolled up into group A. G1 (block 830). Group A. G1 is added to a list and rolled up into the issue A (block 835), which completes processing of issue A.

The method of creating the YAML file then starts with issue B and populates the fields of the node that are not reference, including the system objects (block 840). In FIG. 7, this results in creation of node B based on the Issue Model 605 and creation of Obj B1 from the system objects model 610. Recommendations group B.G1 is then created, and the fields of the node that are not reference are populated (block 845). In FIG. 7, this results in creation of node B.G1 based on the recommendation group model 615. Recommendation R3 is then created and fields of the node are populated (block 850). In FIG. 7, this results in creation of node R3 which is based on the recommendation model 620. R3 is added to a list and rolled up into group B.G1 (block 855). Group B.G1 is added to a list and rolled up into the issue B (block 860), which completes processing of issue B.

FIG. 9 is an example destination model JSON schema, according to some embodiments. In FIG. 9, whitespace indentation is used to denote structure such as nesting. List members are denoted by a leading hyphen "-". As shown in FIG. 9, in some embodiments the class name is used to identify the name of the output data stream or the consumer application that will consume the output data stream. In the example shown in FIG. 9, the "className" is set to "productName". The root node of the YAML file is specified using the nodeType: root. Other node types that are not root do not specify a nodeType.

The root node has a plurality of fields, each of which is identified by "name". In the example shown in FIG. 9, the fields have the following names: system, componentType, systemModel, timestamp, schemaVersion, and issues. Each field also specifies one or more properties, including:

name: the name of the property on the destination model;
value: the name of the property on the source model;
model: if populated, this field is used to refer to the source model object where the "value" can be located;
type: the type of the field to be set, as in java.lang (primitive: byte, short, int, long, float, double, Boolean, char; non-primitive: string, array, class), or also "object" and "array";
Ignored: if true, the group creates just a list of aggregated objects;
$ref: this is used to refer to another class within the template; and
transformer: the transformer class name.

FIG. 10 is an example serialized object created from a destination model class, the destination model class being created by compiling the destination model JSON schema of FIG. 9, according to some embodiments. As shown in FIG. 10, a serialized object created from the productName class includes each of the specified fields: system, componentType, systemModel, timestamp, schemaVersion, and issues. In FIG. 10, example values were provided for each of these fields, it should be understood that these are merely example values of an example object that might be generated as part of the output data stream 235 from the data stream transformer 225.

Figure 11A:
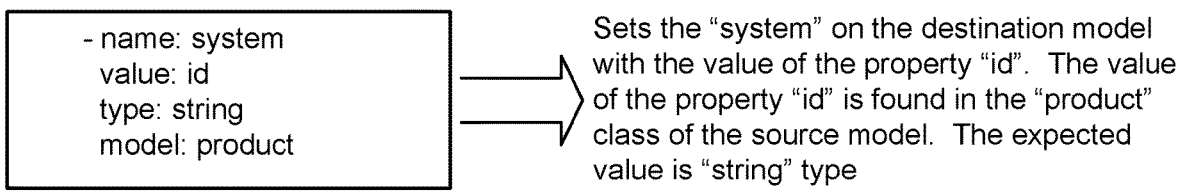

FIGS. 11A-11F are example template definitions of portions of the example destination model JSON schema of FIG. 9, according to some embodiments. Specifically, FIG. 11A shows the field with the name: "system". This field sets the "system" on destination model with the value of the property "id". The value of the property "id" is found in the "product" class of the source model. The expected value is "string" type. Any time a source object is created from the "product" class of the source model, the value of the property "id" of that source object will be used to specify the "value" of the system field in an object created from the destination class "productName".

Figure 11B:
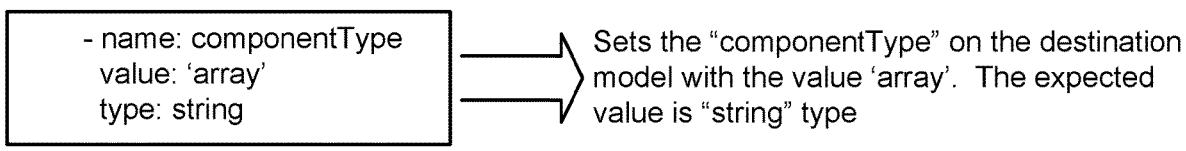

FIG. 11B shows the field with the name: componentType. This field sets the "componentType" on destination model with the fixed value 'array'. The expected value is "string" type. As shown in FIG. 10, the serialized object has the componentType='array'. As shown in FIG. 11B, it is possible to have the value of a field specified as a constant value, rather than having the value of the field specified by a corresponding parameter of a source object.

Figure 11C:
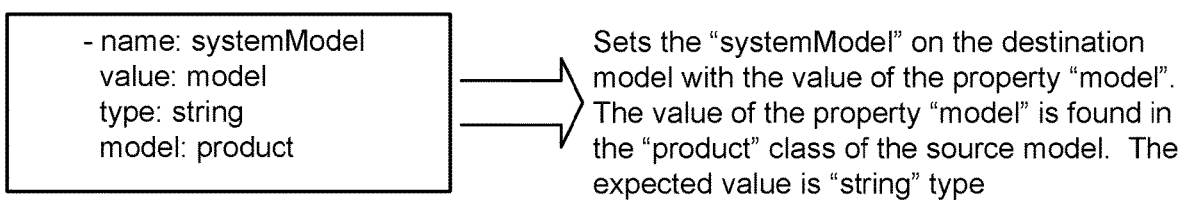

FIG. 11C shows the field with the name: systemModel. This field sets the value of the field "systemModel" on destination model with the value of the property "model", which is found in the "product" class of the source model. The expected value is "string" type.

FIG. 11D shows the field with the name: timestamp. This field sets the value of the field "timestamp" on destination model with the value of the property "LastProcessTime", which is found in the "issue" class of the source model. The expected value is "long" type.

FIG. 11E shows the field with the name: SchemaVersion. This field sets the value of the field "SchemaVersion" on destination model with the fixed value of "1.0.0". Since this is a fixed value, the field does not need to reference any class on the source model. The expected value is "string" type.

FIG. 11F shows the field with the name: issues. This field sets the "issues" field on the destination model as an array type, and the array content is a build on the IssueGroupModel node class on the template. The "ignored" property means that it will just be a list of aggregated objects, in this case issues (value: "issues").

By using a data stream transformer that is based on a configuration file, it is possible to transform an input data stream based on a source model to a set of output data streams based on a set of destination models. Any time the source model of the input data stream changes, or any time the destination model of one of the output data streams changes, it is possible to accommodate that change in the data stream transformer simply by changing the configuration file. Since the configuration file is created based on a destination model JSON schema, changing the data stream transformer configuration can be implemented simply by adjusting the JSON schema defining relationship between the source model and the destination model. This simplifies the source application that is providing the output, because it is no longer necessary to change the code of the source application in connection with changes to the destination model. The data stream transformer can transpose data from a source model to any defined unrelated destination model using standardized configuration definition, which is able to be implemented regardless of the destination model's complexity.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of data stream model transformation, comprising:
    creating a first JSON schema describing a first destination model of a consumer application, the first destination model defining a first destination data stream model of a first destination data stream to be input to the consumer application;
    creating a first YAML template based on the first JSON schema, the first YAML template defining a first transformation to be implemented by a data stream transformer to transform a source data stream output by a source application and having a source data stream model, into the first destination data stream having the first destination data stream model;
    compiling the first destination model JSON schema, by the data stream transformer, to create a set of first destination model classes;
    generating the source data stream by the source application, the source data stream including source objects generated by the source application, the source objects being defined according to the source data stream model;
    using reflection, by the data stream transformer, to obtain the source objects; and
    using the first YAML template, by the data stream transformer, to generate corresponding first destination objects from the source objects, the corresponding first destination objects being created from the set of first destination model classes and forming the first destination data stream defined according to the first destination data stream model.

2. The method of claim 1, wherein each source object includes one or more values, and wherein the first YAML template defines a first set of methods configured to set values of the first destination objects based on the one or more values of the source objects;
    wherein reflection is used, by the data stream transformer, to inspect classes, methods, properties, and types of the source objects generated by the source application during runtime; and
    wherein the first YAML template is used, by the data stream transformer, to generate the corresponding first destination objects from the inspected classes, methods, properties, and types of the source objects.

3. The method of claim 1, wherein the first destination model JSON schema defines a root node having a plurality of fields, at least some of the fields each including a plurality of properties.

4. The method of claim 3, wherein the properties include a name of the property on the first destination model, a value of the property on the source model, and a source object of the source data stream model where the value of the property is located.

5. The method of claim 3, wherein the properties include a reference to another first destination model class.

6. The method of claim 1, further comprising:
    creating a second JSON schema describing a second destination model of a second consumer application, the second destination model defining a second destination data stream model of a second destination data stream to be input to the second consumer application;
    creating a second YAML template based on the second JSON schema, the second YAML template defining a second transformation to be implemented by the data stream transformer to transform the source data stream output by the source application and having the source data stream model, into the second data stream having the second destination data stream model;
    compiling the second destination model JSON schema, by the data stream transformer, to create a set of second destination model classes; and
    using the second YAML template, by the data stream transformer, to generate corresponding second destination objects from the source objects, the corresponding second destination objects being created from the set of second destination model classes and forming the second destination data stream defined according to the second destination data stream model.

7. The method of claim 6, wherein the first YAML template and the second YAML template are contained in a single configuration file accessed by the data stream transformer, the single configuration file being used by the data stream transformer to generate both the first destination data stream and the second destination data stream.

8. The method of claim 6, wherein each source object includes one or more values, and wherein the second YAML template defines a second set of methods configured to set values of the second destination objects based on the one or more values of the source objects.

9. The method of claim 8, wherein the second destination model JSON schema defines a root node having a plurality of fields, at least some of the fields each including a plurality of properties.

10. The method of claim 8, wherein the properties include a name of the property on the second destination model, and a value of the property, the value of the property being either a static value, or a value of the property on the source model and a source object of the source data stream model where the value of the property is located.

11. A system for data stream model transformation, comprising:
    one or more processors and one or more storage devices storing instructions that are operable, when executed by the one or more processors, to cause the one or more processors to perform operations comprising:

creating a first JSON schema describing a first destination model of a consumer application, the first destination model defining a first destination data stream model of a first destination data stream to be input to the consumer application;

creating a first YAML template based on the first JSON schema, the first YAML template defining a first transformation to be implemented by a data stream transformer to transform a source data stream output by a source application and having a source data stream model, into the first destination data stream having the first destination data stream model;

compiling the first destination model JSON schema, by the data stream transformer, to create a set of first destination model classes;

generating the source data stream by the source application, the source data stream including source objects generated by the source application, the source objects being defined according to the source data stream model;

using reflection, by the data stream transformer, to obtain the source objects; and using the first YAML template, by the data stream transformer, to generate corresponding first destination objects from the source objects, the corresponding first destination objects being created from the set of first destination model classes and forming the first destination data stream defined according to the first destination data stream model.

12. The system of claim 11, wherein each source object includes one or more values, and wherein the first YAML template defines a first set of methods configured to set values of the first destination objects based on the one or more values of the source objects;

wherein reflection is used, by the data stream transformer, to inspect classes, methods, properties, and types of the source objects generated by the source application during runtime; and wherein the first YAML template is used, by the data stream transformer, to generate the corresponding first destination objects from the inspected classes, methods, properties, and types of the source objects.

13. The system of claim 11, wherein the first destination model JSON schema defines a root node having a plurality of fields, at least some of the fields each including a plurality of properties.

14. The system of claim 13, wherein the properties include a name of the property on the first destination model, a value of the property on the source model, and a source object of the source data stream model where the value of the property is located.

15. The system of claim 13, wherein the properties include a reference to another first destination model class.

16. The system of claim 11, the operations further comprising:

creating a second JSON schema describing a second destination model of a second consumer application, the second destination model defining a second destination data stream model of a second destination data stream to be input to the second consumer application;

creating a second YAML template based on the second JSON schema, the second YAML template defining a second transformation to be implemented by the data stream transformer to transform the source data stream output by the source application and having the source data stream model, into the second data stream having the second destination data stream model;

compiling the second destination model JSON schema, by the data stream transformer, to create a set of second destination model classes; and using the second YAML template, by the data stream transformer, to generate corresponding second destination objects from the source objects, the corresponding second destination objects being created from the set of second destination model classes and forming the second destination data stream defined according to the second destination data stream model.

17. The system of claim 16, wherein the first YAML template and the second YAML template are contained in a single configuration file accessed by the data stream transformer, the single configuration file being used by the data stream transformer to generate both the first destination data stream and the second destination data stream.

18. The system of claim 16, wherein each source object includes one or more values, and wherein the second YAML template defines a second set of methods configured to set values of the second destination objects based on the one or more values of the source objects.

19. The system of claim 18, wherein the second destination model JSON schema defines a root node having a plurality of fields, at least some of the fields each including a plurality of properties.

20. The system of claim 18, wherein the properties include a name of the property on the second destination model, and a value of the property, the value of the property being either a static value, or a value of the property on the source model and a source object of the source data stream model where the value of the property is located.

* * * * *